Sept. 5, 1933.  C. M. TUTTLE ET AL  1,925,547
ELECTRICAL CONTROL AND SYSTEM
Filed May 26, 1928  3 Sheets-Sheet 1
FIG_1_
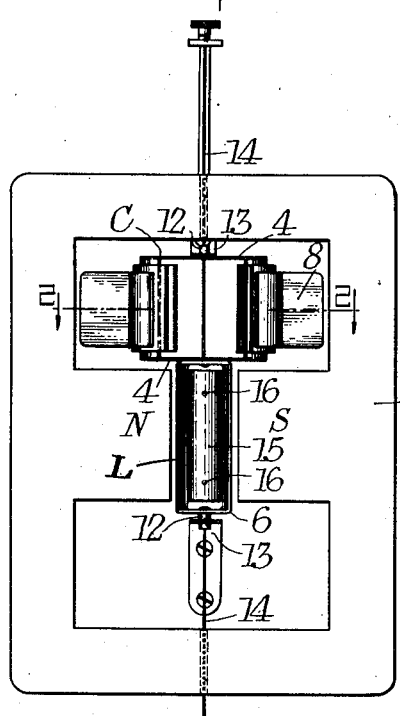
FIG_2_
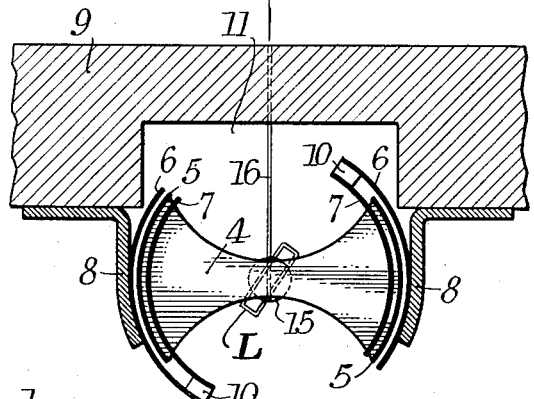
FIG_4_
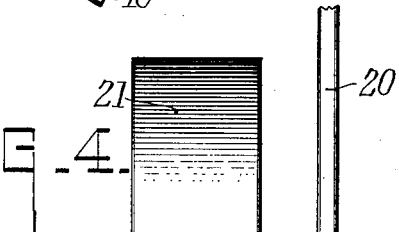
FIG_3_
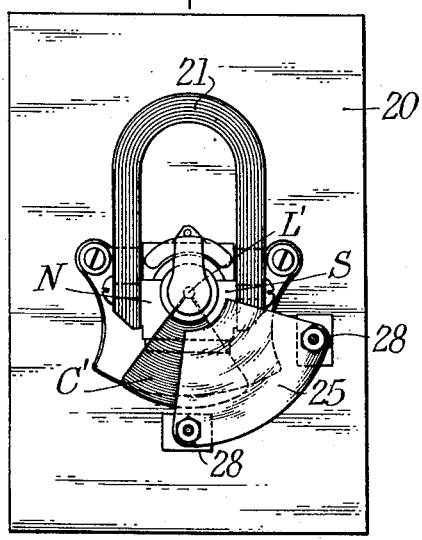
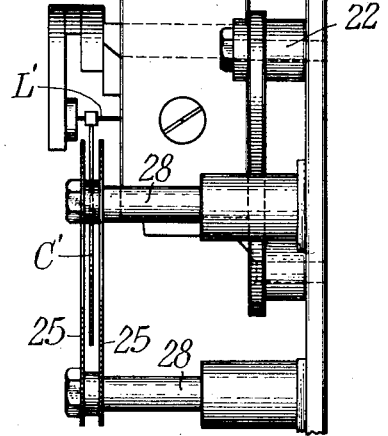
Inventors,
Clifton M. Tuttle &
Fordyce E. Tuttle,
By Newton M. Perrins
Attorney Sept. 5, 1933.     C. M. TUTTLE ET AL     1,925,547
ELECTRICAL CONTROL AND SYSTEM
Filed May 26, 1928     3 Sheets-Sheet 2
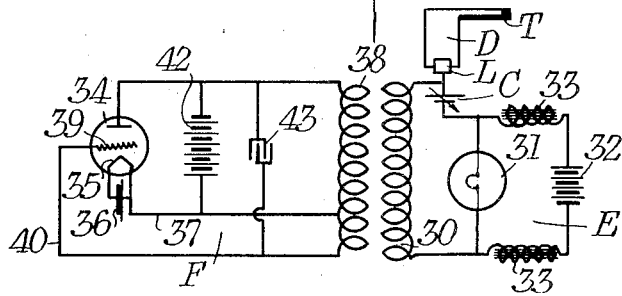
FIG_5.
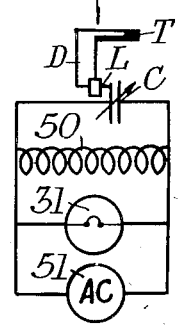
FIG_9.
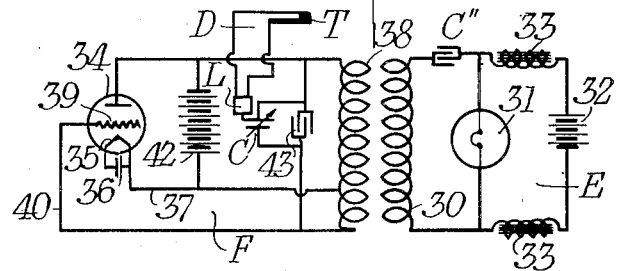
FIG_6.
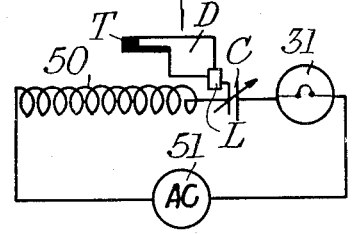
FIG_10.
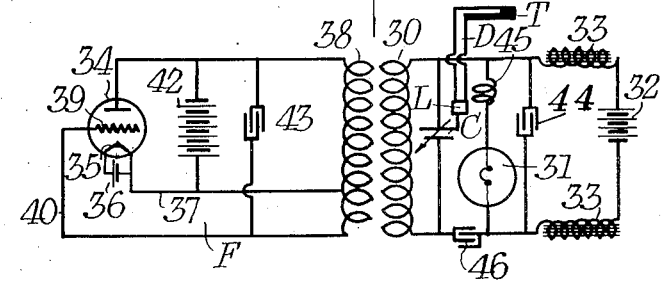
FIG_7.
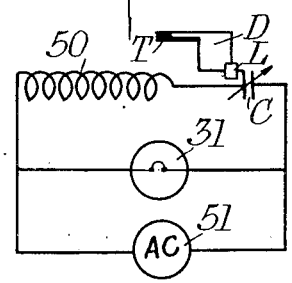
FIG_11.
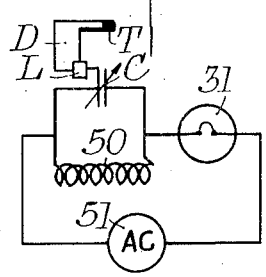
FIG_8.
Inventors
Clifton M. Tuttle &
Fordyce E. Tuttle,
By
Attorney

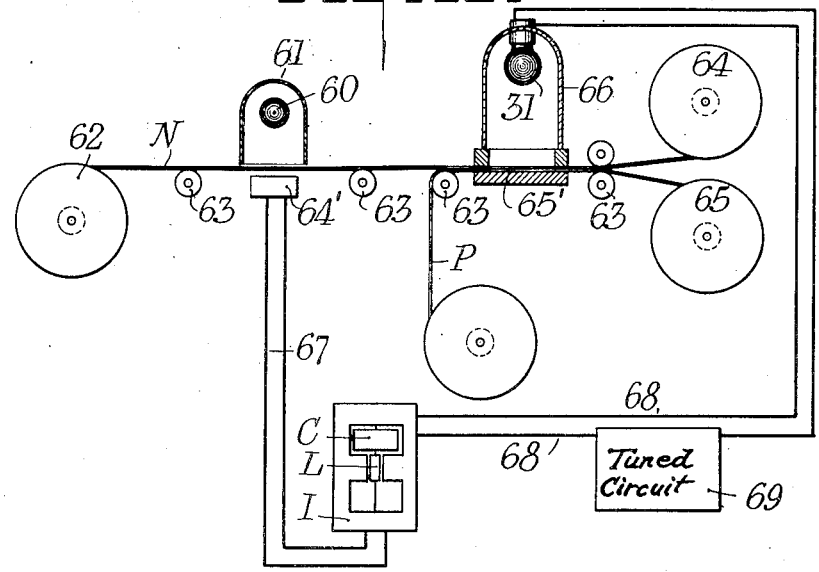
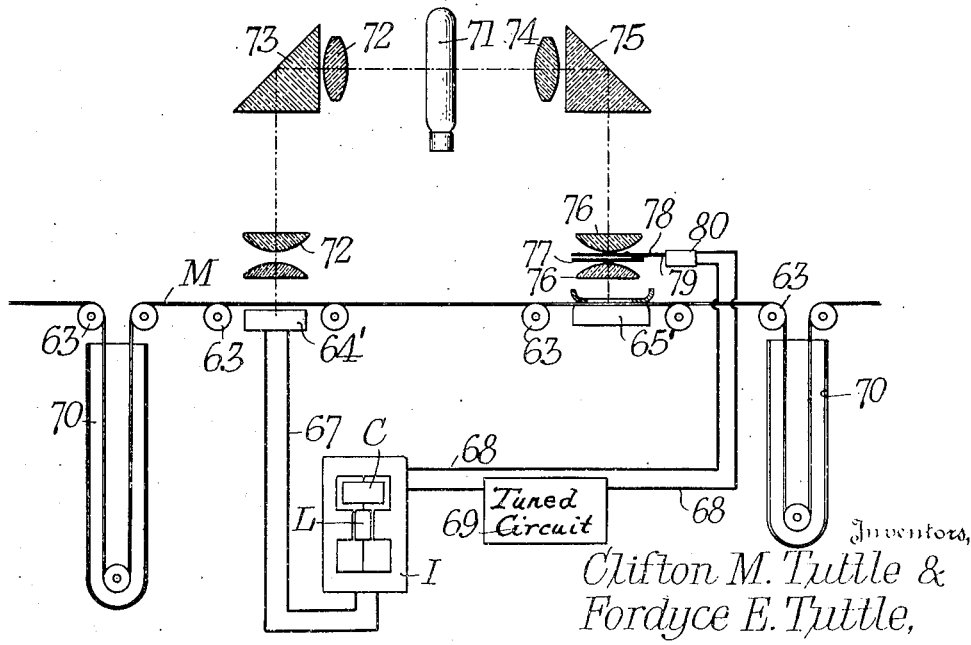

Patented Sept. 5, 1933

1,925,547

UNITED STATES PATENT OFFICE 1,925,547

ELECTRICAL CONTROL AND SYSTEM

Clifton M. Tuttle and Fordyce E. Tuttle, Rochester, N. Y., assignors to Eastman Kodak Company, Rochester, N. Y., a corporation of New York Application May 26, 1928. Serial No. 280,776

3 Claims. (Cl. 250—41.5)

This invention relates to electrical relay systems and mechanisms by which we mean instrumentalities whereby variations in one electrical circuit are enabled to control the flow of current and the operation of devices in a second circuit.

More specifically we have invented as our relay apparatus an instrument comprising a part movable as a result of variation in current flow, such as a galvanometer, the movable member carrying or controlling a movable member which is a part of a variable condenser. The condenser elements, being in a circuit separate from that including the galvanometer, influence the flow of current therethrough, resulting in such changes as a variation in brightness of a lamp or the movement of a galvanometer or other indicator.

As an illustration of a useful application of this relay, and as an embodiment of a new and useful combination including the relay as an element, we also show and describe a system as applied to a continuous, automatic, photographic printer, in which a motion picture negative film passes between a source of light and a radiation responsive element, the latter being in circuit with a galvanometer, the movable vane of which carries a movable condenser element in a second circuit and controlling the brilliancy of a lamp used to print on a sensitive film from said negative film.

The specific advantages and objects attained by our invention will be more particularly pointed out in the following description wherein the same reference characters designate the same parts in the several figures and in which Fig. 1 is a side view of one form of our improved relay;

Fig. 2 is a section on the line 2—2 showing the structure of the condenser;

Fig. 3 is a plan of a different form of relay;

Fig. 4 is an elevation of the apparatus shown in Fig. 3;

Figs. 5 to 11 inclusive show simple diagrams of illustrative electric circuits embodying our invention;

Figs. 12 and 13 are diagrammatic illustrations of apparatus for the printing of film and including our invention.

In Figures 1 and 2 is shown a preferred form of our improved relay. It includes the structure of a modified commercial galvanometer including a fixed magnet frame 1 having pole pieces N and S, between which is suspended a coil L. Carried by the coil is a condenser element C movable therewith and comprising upper and lower horizontal frame members 4 and opposite, cylindrically arcuate, sheet metal condenser plates 5. These plates pass between the spaced, fixed, arcuate pairs of plates 6 and 7, the plate 6 of each pair being carried by a support 8 carried by the wall 9, and in turn carrying the plate 7 by means of the spacing block 10. The wall 9 is recessed at 11 to accommodate these condenser members. Lugs 12 pass through apertures in the centering guides 13 also carried by wall 9, and the combined coil and movable condenser element are carried by the suspension filaments 14, which also serve as electrical connections to the coil. The core 15 is carried by supports 16.

A second typical form is shown by way of example in Figures 3 and 4. A board 20 carries a permanent magnet 21 by means of the supports 22 and between the poles N and S is suspended a galvanometer coil at L' in the usual way, carrying a light vane in the form of a segmental condenser plate C' mounted to swing between the fixed spaced plates 25 carried by supports 28. Numerous other embodiments of our invention insofar as it relates to the relay instrument are possible.

A simple electrical arrangement utilizing this relay is shown in Figure 5, in which a radiation sensitive element, such as a thermopile T, is in a circuit D with the galvanometer coil L carrying the movable element of the variable condenser C. The condenser as a whole is in a second circuit E in series with an inductance coil 30 and a lamp 31. A battery 32 or other source of continuous or low frequency current in a parallel circuit also furnishes energy for the lamp, choke coils 33 being included to force the high frequency current, hereafter mentioned, through the lamp.

A typical high frequency oscillating circuit F is inductively connected to said second circuit. In the circuit shown in Figure 5 this includes a vacuum tube 34 of known type having the filament 35 heated by the A battery 36, and connected by wire 37 with a point in the primary coil 38, which is inductively associated with coil 30, grid 39 connected by wire 40 with one end of coil 38, and plate 41 connected with the other end of coil 38, the B battery 42 being connected between the plate and filament and condenser 43 between the plate and grid. In the circuits shown in Figure 5 the power picked up by the circuit E from the circuit F depends on the closeness of the tuning of the two circuits. If the oscillator circuit F is kept at a definite wave length, the wattage supplied to the lamp 31 can be made to vary by the movement of the condenser element which may be controlled in turn by the thermopile T.

The battery or other source of power furnishes to lamp 31 a non-variable wattage which will in general produce the minimum required radiation from the lamp. The additional variable wattage furnished by the oscillator circuit modulates the intensity of the lamp to any desired level above the minimum.

It is also obvious that the variable condenser C may be positioned in circuit F rather than in circuit E, this modification being shown in Figure 6, wherein the variable condenser C is shown as in parallel with condenser 43 and a fixed condenser C'' is used in circuit E, the reference characters being otherwise the same as in Figure 5.

Still another desirable arrangement is shown in Figure 7 in which the reference characters are the same as in Figure 5, except as noted. The condenser C is shown here as across the coil 30 and the lamp 31 is shunted with a condenser 44 of large capacity and a small inductance 45 may be placed in series with the lamp. As in the other circuits E, the inductance 30 and lamp 31 must be in series with a condenser, in this figure designated 46. The lamp, the filament of which is in effect an inductance, and the condenser constitute a circuit which is resonant either to the fundamental or to some harmonic of the oscillator circuit. This has the advantage of eliminating practically all of the electrostatic effect in the variable condenser which otherwise has a tendency to act as an electrostatic volt meter, lessening the sensitivity of its response to the thermopile voltage. This arrangement does not greatly affect the sharpness of tuning in the circuit.

Diagrams illustrative of circuits applicable with an alternating source of current are shown in Figures 8, 9, 10 and 11, these differing only in the position of the inductance 50 and the variable condenser C with respect to the lamp 31. In each a source of alternating current 51 is shown. In Figures 8 and 9 parallel resonant circuits are shown respectively in series with and shunted across the lamp; and in Figures 10 and 11 series resonant circuits are shown respectively in series with and shunted across the lamp. Further explanation of these diagrams is unnecessary as they are simple and obvious to those skilled in the art.

In all of the electrical diagrams, it is to be understood that simple and typical circuits are shown with only enough elements to enable one skilled in the art to grasp the points of the present invention.

The above described apparatus and circuits are of particular use in connection with continuous automatic printing machines of the type disclosed in the copending applications of L. A. Jones and C. M. Tuttle, Serial No. 179,510, filed March 30, 1927 and of C. M. Tuttle and H. E. White, Serial No. 221,890, filed September 26, 1927 and we will describe briefly one method of application of the invention to such use. Reference is made to such applications for mechanical details useful in printing machines of this type, only such essential apparatus being here indicated as to disclose the combinations included in our invention.

Referring to Figure 12, 60 is a lamp in housing 61 beneath which a negative motion picture film N carrying photographic images is drawn from a supply reel 62 by means of sprocket 63. Light from the lamp passes through the film and falls on a radiation sensitive instrument, such as a thermopile in casing 64'. The negative film then passes a printing station 65 together with a photographically sensitive film P, the films being advanced by additional sprockets or rolls 63, and then being wound on take-up reels 64 and 65. At the printing station light from a lamp 31 in lamp house 66 passes through the negative and impresses the sensitive film. The cell in casing 64 is connected by wires 67 with the coil L of the instrument I, which is of the type shown in Figures 1 and 2. The condenser C of this instrument is connected by wires 68 with the lamp 31 and with other suitable electrical apparatus in casing 69. The particular apparatus may be that shown in the several diagrams or its equivalent.

Figure 13 illustrates diagramatically another embodiment here shown as applied to apparatus for treating film by a reversal process. The continuous film M is drawn from a series of processing tanks 70, one only of which is shown, and at this stage has images formed by development and bleaching, as is well known. This film is advanced over casing 64 containing a radiation responsive element and then through a printing station 65' by means of sprockets or rolls 63, and then to further treatment tanks 70. Light from a lamp 71 is directed by an optical system including lenses 72 and reflectors 73 through the film upon the radiation sensitive cell or thermopile in casing 64. Light is also directed from the lamp by means of a second optical system including a lens 74, reflector 75 and condenser lenses 76 upon the film at printing station 65'. Between the condenser lenses is mounted a shutter diaphragm of the type disclosed in said copending applications and including an apertured diaphragm 77 over which moves a shutter 78 carried by vane 79 of the electrical instrument 80. This instrument is controlled in the same way as lamp 31 in Figure 12, the connections being indicated by the same reference characters.

The electrical relay which we have described has been found to furnish a means of control of very great delicacy. The intensity of some measured illumination can, by its use, automatically control radiations from an electric light source, either to furnish controlled constant radiation in spite of a tendency to vary, or to cause variations in accordance with the controlling light. The rate of modulation of current in one circuit obviously can be made any desired function of the rate of change of current in another.

It is to be understood that the particular instruments here shown, the circuits in which they are connected and the application to practical problems illustrated are all by way of example and that numerous embodiments of our inventions are possible. We contemplate as included within our invention all such modifications and equivalents as fall within the scope of the appended claims.

Having thus described our invention, what we claim as new and desire to secure by Letters Patent is:

1. A circuit for regulating the intensity of a light source in response to the radiant energy falling upon a thermopile, comprising in combination a source of constant high frequency, a lamp connected to said source, a parallel resonant circuit for varying the wattage supplied to the lamp in response to changes in the constants of said resonant circuit, a thermopile and means controlled by said thermopile for changing the constants of said circuit.

2. Means for regulating the intensity of a light source, in response to variations in the intensity of a beam of light, comprising a lamp, a source of alternating current for energizing said lamp, a variable condenser for varying the wattage therefor supplied to said lamp in response to changes in the capacity of said condenser, a light responsive element and electromechanical means for changing the capacity of said condenser in response to variations in the intensity of the light beam falling on said light responsive element.

3. Means for regulating the intensity of a light source in response to variations in the intensity of a beam of light comprising a lamp, a light responsive element positioned to receive light from said lamp, a source of alternating current for energizing said lamp, a resonant circuit coupled to said lamp for controlling the current flowing through said lamp in accordance with the tuning of said resonant circuit and electromechanical means controlled by said light responsive element for varying the tuning of said resonant circuit in accordance with the intensity of light received by said light responsive element.

CLIFTON M. TUTTLE.
FORDYCE E. TUTTLE.